United States Patent [19]

Teagan

[11] Patent Number: 4,539,975
[45] Date of Patent: Sep. 10, 1985

[54] INTEGRAL STORAGE SOLAR HEATING SYSTEM

[75] Inventor: William P. Teagan, Acton, Mass.

[73] Assignee: Arthur D. Little, Inc., Cambridge, Mass.

[21] Appl. No.: 546,262

[22] Filed: Oct. 28, 1983

Related U.S. Application Data

[63] Continuation-in-part of Ser. No. 356,882, Mar. 10, 1982, abandoned.

[51] Int. Cl.³ .................................................. F24J 3/02
[52] U.S. Cl. .................................. 126/439; 126/430; 126/450; 126/417
[58] Field of Search ............... 126/437, 438, 439, 450, 126/417, 430, 436

[56] References Cited

U.S. PATENT DOCUMENTS

| | | | |
|---|---|---|---|
| 3,159,554 | 12/1964 | Mount | 126/450 X |
| 3,841,302 | 10/1974 | Falbel | 126/439 X |
| 4,084,578 | 4/1978 | Ishibashi | 126/437 X |
| 4,137,901 | 2/1979 | Maier | 126/439 X |
| 4,232,656 | 11/1980 | Teagan | 126/433 X |
| 4,296,732 | 10/1981 | Bernhardt et al. | 126/426 |

FOREIGN PATENT DOCUMENTS 2827708 1/1979 Fed. Rep. of Germany ...... 126/439

*Primary Examiner*—Larry Jones
*Attorney, Agent, or Firm*—Richard J. Hammond

[57] ABSTRACT

An improved integral storage solar heating system is described which comprises an integral storage solar collector comprising an absorber means, a heat storage medium of large heat capacity and high thermal conductivity directly heated by the absorber means and a water flow path in heat exchange relationship with said heat storage medium such having a water inlet and water outlet; and a primary pressurized water supply line connected to the water inlet, where pressurized water from the supply line into the water inlet forces fresh water through the water flow path as heated water is removed through the water outlet. The improvement comprises covering the integral storage collector with a collector cover essentially transparent to solar radiation, the cover and storage collector are connected by at least one panel. Solar radiation passes through the transparent cover and is absorbed by the absorber means of the collector. The collector is oriented substantially parallel to the horizon.

19 Claims, 5 Drawing Figures

INTEGRAL STORAGE SOLAR HEATING SYSTEM

This application is a continuation-in-part of U.S. patent application Ser. No. 356,882, filed Mar. 10, 1982, now abandoned.

FIELD OF INVENTION

This invention relates to the solar heating of water. In particular, it relates to an improved solar heat storage collector advantageously adapted for use on surfaces substantially parallel with the horizon.

DESCRIPTION OF THE PRIOR ART

In early solar water heating systems such as disclosed in U.S. Pat. Nos. 1,747,826 to Gould and 1,753,227 to Wheeler et al, hot water pipes in a solar collector were connected to a hot water storage tank. The heated water flowed into the tank by convection and to that end the solar collector was at a level lower than the water storage tank. Because it is generally preferred to have the solar collector at a high point such as on a roof and the water storage at a low point such as in a basement, such convection systems are not usually practical. Further, unless the solar collector is disconnected at night, cooling of the stored hot water may result. Thus some temperature responsive valve control is required. Once disconnected, if water is then allowed to remain in the collector it is subject to freezing.

A modern adaptation of the older water heating systems is found in U.S. Pat. No. 4,010,734 to Chayet. In that patent a temperature controlled pump is used to pump water from a hot water storage tank to the solar collector. A supplemental electrical heating element is also provided in the storage tank. Such a system requires temperature control circuitry as well as an electrical pump. With periodic turning on and off of the pump, the pump and circuitry are subject to failure. The system also suffers from a freezing problem if water is permitted to remain in the collector on cold nights.

Most conventional solar water heating systems avoid the freezing problem by using a nonfreezing heat transfer fluid. The transfer fluid is pumped in a closed circuit which passes in heat exchange relationship with the water to be heated. As in the Chayet system, temperature controls and a pump are required for the heat transfer fluid. The systems also suffer from the risk of contamination of the hot water with leakage of the nonfreezing heat transfer fluid. Further, such systems are expensive. Heat transfer fluid is much more expensive than plain water, and to avoid contamination of the water and to avoid other leakage of the expensive heat transfer fluid, a very tight and thus expensive fluid transfer system must be provided.

A particularly effective solar water heating system, U.S. Pat. No. 4,232,656, Teagan incorporated herein by reference discloses and claims a simplified water system which does not require a pump or temperature control circuitry and which avoids the risk of contamination of the heated water while still avoiding freezing of the water.

In all of the prior art systems noted, the solar absorbers are designed to be externally supported since it has been commonly believed that a specific orientation of such to the incident solar radiation is required in order to achieve optimum heating of the heat storage medium. In addition, where tilted solar absorbers are of a nonrigid form, the hydrostatic head built up solely because of the tilting disadvantageously necessitates the incorporation of some form of rigidifying means.

It is therefore an object of the present invention to provide an improved simplified solar water system that does not require the use of any external supporting means for the integral storage collector part of such system.

SUMMARY OF THE INVENTION

The present invention is based on an improved solar heating system for heating water comprising an integral storage collector such including an absorber for absorbing solar energy, a heat storage medium of large heat capacity and high thermal conductivity for storing such energy and a water flow path in heat exchange relationship with the heat storage medium. The improvement in such a system comprises covering the absorber with a cover essentially transparent to solar radiation, such cover being tilted with respect to the absorber. Between the tilted cover and the absorber is at least one panel that optionally has a reflecting surface to reflect any incident sun energy onto the absorber. The absorber is positioned so as to be substantially parallel to the horizon.

BRIEF DESCRIPTION OF THE DRAWINGS

The foregoing and other objects, features and advantages of the invention will be apparent from the following more particular description of the preferred embodiments, as illustrated in the accompanying drawings in which like reference characters refer to the same or similar parts throughout the different views. The drawings are not necessarily to scale, emphasis instead being placed upon illustrating the principles of the invention.

DESCRIPTION OF THE PREFERRED EMBODIMENTS

Figure 1:
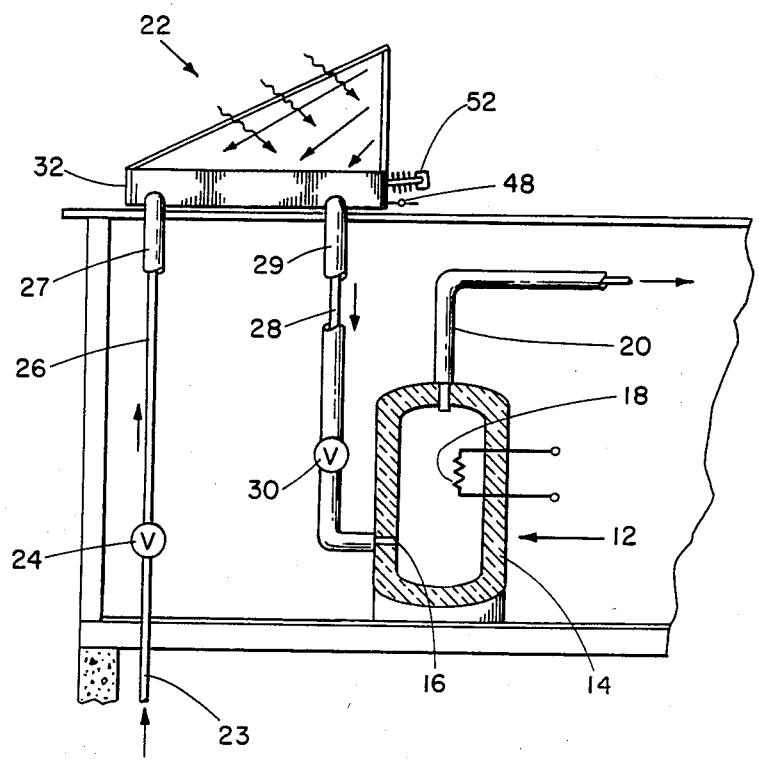
FIG. 1 is an illustration of a solar heating system incorporating the improvement of the present invention.

As shown in FIG. 1, hot water is stored in a conventional hot water tank 12 which is generally located in the basement on ground level floor of a building. The tank is wrapped in a heat insulating material 14.

Water is supplied to the tank 12 through inlet pipe 16 and is heated by an electrical resistance heating coil 18. The heating coil is temperature controlled to maintain a predetermined range of water temperature. As an alternative, some other form of heating may be provided, e.g., a gas flame. From outlet 20, the heated water is provided on demand at any number of outlets throughout the building.

In accordance with the present invention, the water supplied to the conventional hot water tank 12 is first preheated in a substantially horizontal integral storage collector 22. Water at line pressure is provided from a primary water supply line 23 through a valve 24 to the collector by water inlet pipe 26. The supply line 23 is generally connected to a town water supply and supplies water at a pressure which obviates pumps at individual buildings.

After preheating in the substantially horizontal integral storage collector 22, the water, still at line pressure, flows through the collector outlet pipe 28 and valve 30 to hot water tank inlet port 16. Valves 24 and 30 are conventional valves, hand operated, and remain open under normal operation of the system.

The entire length of pipe 28 is wrapped in thermal insulation 29 to reduce heat loss from the pipe. Only the length of pipe 26, exposed to a cold environment is insulated at 27. With that insulation, sufficient heat is conducted from the building and from the collector through pipe 26 to prevent freezing of water in the pipe.

Figure 2:
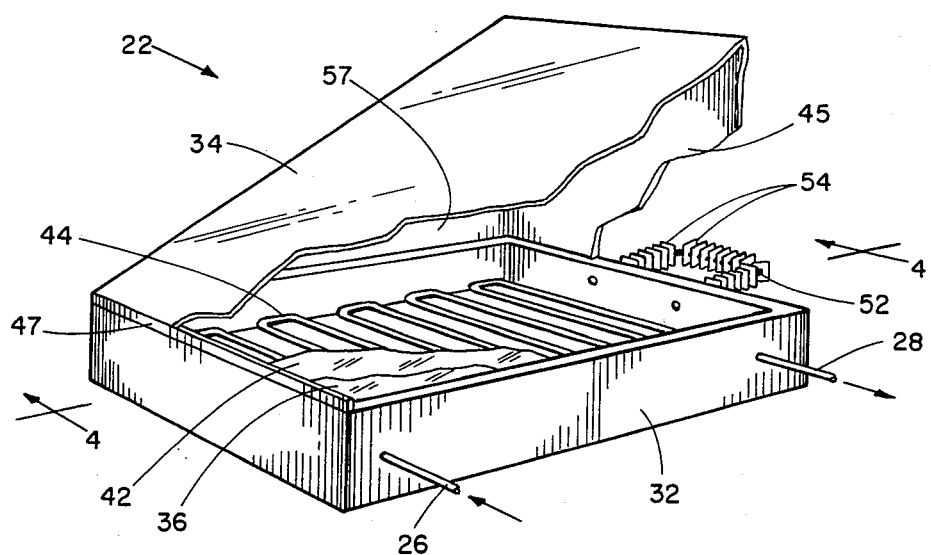
FIG. 2 is a perspective view of the integral storage collector shown in FIG. 1.
Figure 3:
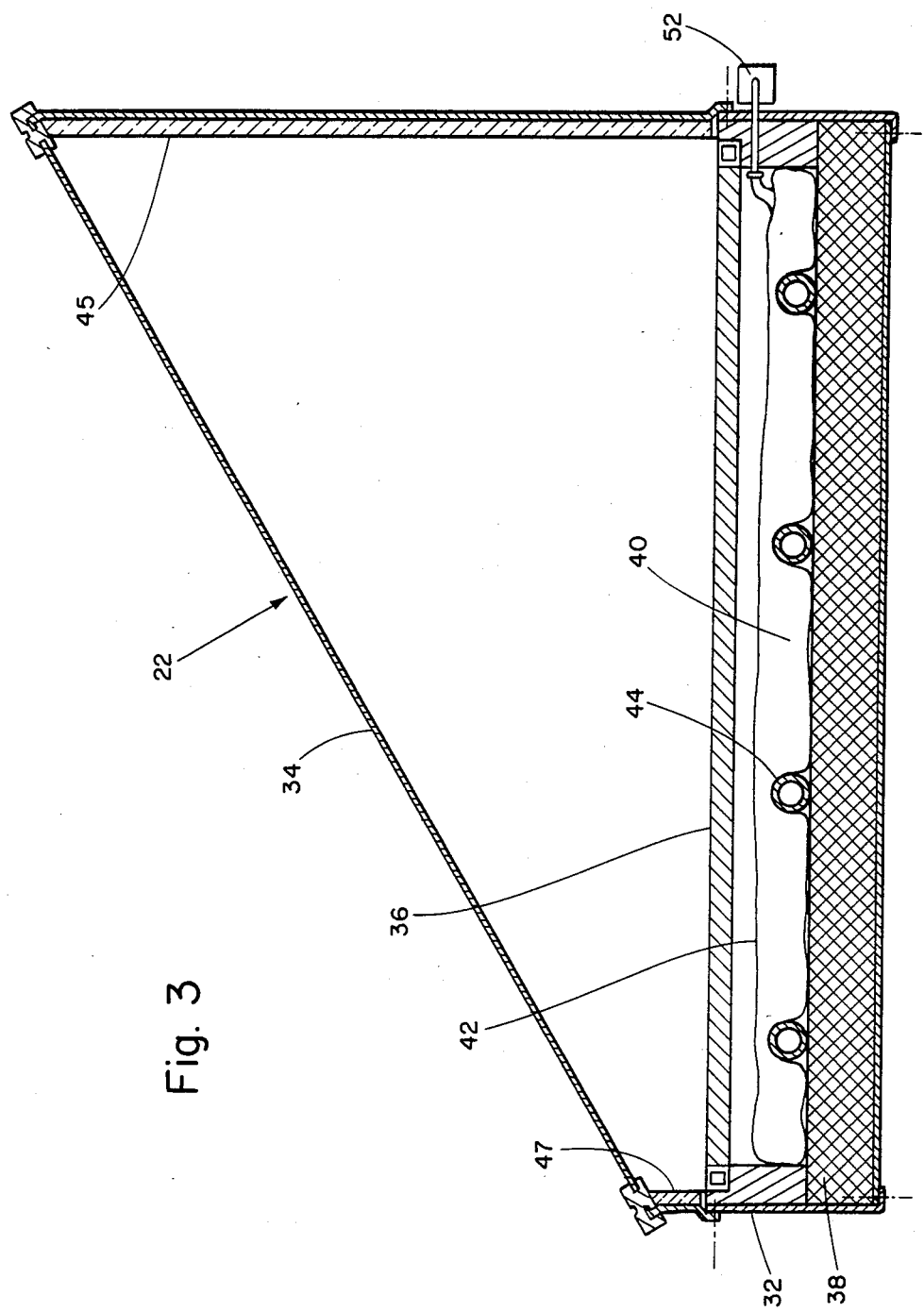
FIG. 3 is a cross-sectional view of the integral storage collector of FIG. 2, taken along line 4—4.
Figure 5:
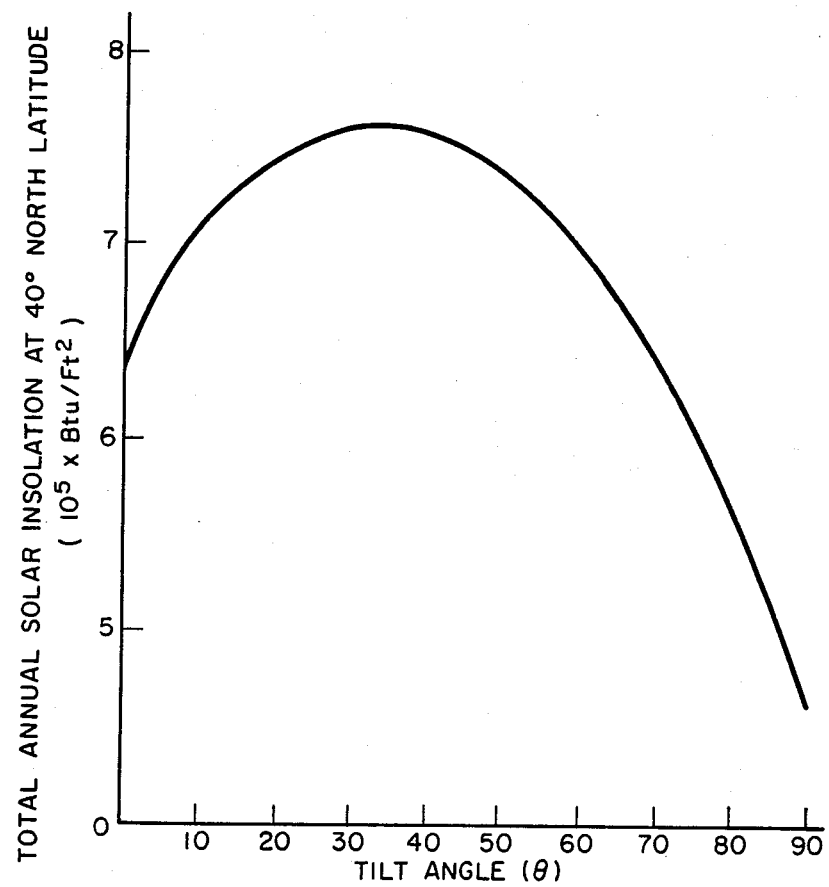
FIG. 5 shows the relationship of annual solar insulation to collector tilt angle.

The substantially horizontal integral solar collector 22 of FIG. 1 is shown in more detail in FIG. 2. The collector includes a box casing 32. The open side of the casing is covered by an outer cover 34, which may be glass, plastic or any other material essentially transparent to solar radiation. Cover 34 faces the sun and is tilted with respect to the upper energy absorbing surface of the absorber 42 (FIG. 3). Typically such tilt can be about 5° to about 90° to the absorber surface. The common perception in the solar industry is that the tilt angle of the cover plate should be approximately equal to latitude of the collector sites (about 42° at New York). As a result, collector and system designs go to great, and costly pains to ensure strict adherence to achieving "optimum" performance by arranging for relatively high collector tilt and collector cover angles. This prior art design, however, does not recognize the surprising discovery that very little heat collection capability is lost by making the tilt angle quite low. For example, as indicated in FIG. 5, the difference in annual solar incidence on the collector surface between a tilt angle of 15° and one at 40° is only 8 percent during the year. There are several significant advantages which result from a low tilt angle:

the amount of material required to fabricate the collector assemblies is reduced significantly;

the low vertical profile reduces wind loads which make it possible to place collectors on a roof with little or no structural support (structural costs can amount to 50 percent of installation costs with conventional designs); and the low profile results in a negligible visual impact (a common complaint with other systems is their significant and not always pleasant impact on the aesthetics of buildings).

Based on the above, the tilt angle ranges from about 5° to about 40° to the absorber surface, preferably about 15° to about 40° most preferably about 25° to about 30°.

Spaced below the collector cover 34 and above absorber surface 42 is at least one solar radiation transparent panel 36 (it is transparent to light but reflects heat) which may be constructed of the same material as the cover 34, but preferably is Teflon ®. Panel 36 may be oriented parallel with cover 34 or parallel with absorber surface 42 or at any other angle between these two extremes. Preferably panel 36 is substantially parallel to absorber surface 42. Positioned between the cover 34 and the absorber surface 42 is at least one panel 45 which optionally can bear solar radiation reflecting means usually an aluminum foil-faced panel. The panel 45 is essentially perpendicular to absorber surface 42 and is preferably located at the outer edge of such surface, facing in the general direction of the source of incoming solar radiation. A second panel 47 which also can optionally be a facing 45 and located at the opposite outer edge of the absorber surface 42 can also be employed. It should be noted that panel 45, without such radiation reflecting means causes very little loss in absorber efficiency, hence the optional character of such reflecting means.

The bottom and sides of casing 32 are packed with thermal insulating material 38. A flat tank 40 is seated in the insulation. This tank has the above-disclosed energy absorbing surface 42. Such surface is coated onto the tank and may be a flat black paint or a selective black coating which is a good absorber of solar radiation but a poor emitter of infrared energy. Preferably, the tank is an elastomeric material such as Hypalon ® rubber, having a black pigmentation. By using such preferred material, it is preferable to have the serpentine heat storage conduit 44 exterior to the rubber tank, i.e., between the rubber and insulation, thereby simplifying construction and decreasing costs (FIG. 3). In such configuration, it is desirable to have tank wall thickness in the range of 10–40 mils, preferably 20–30 mils.

Figure 4:
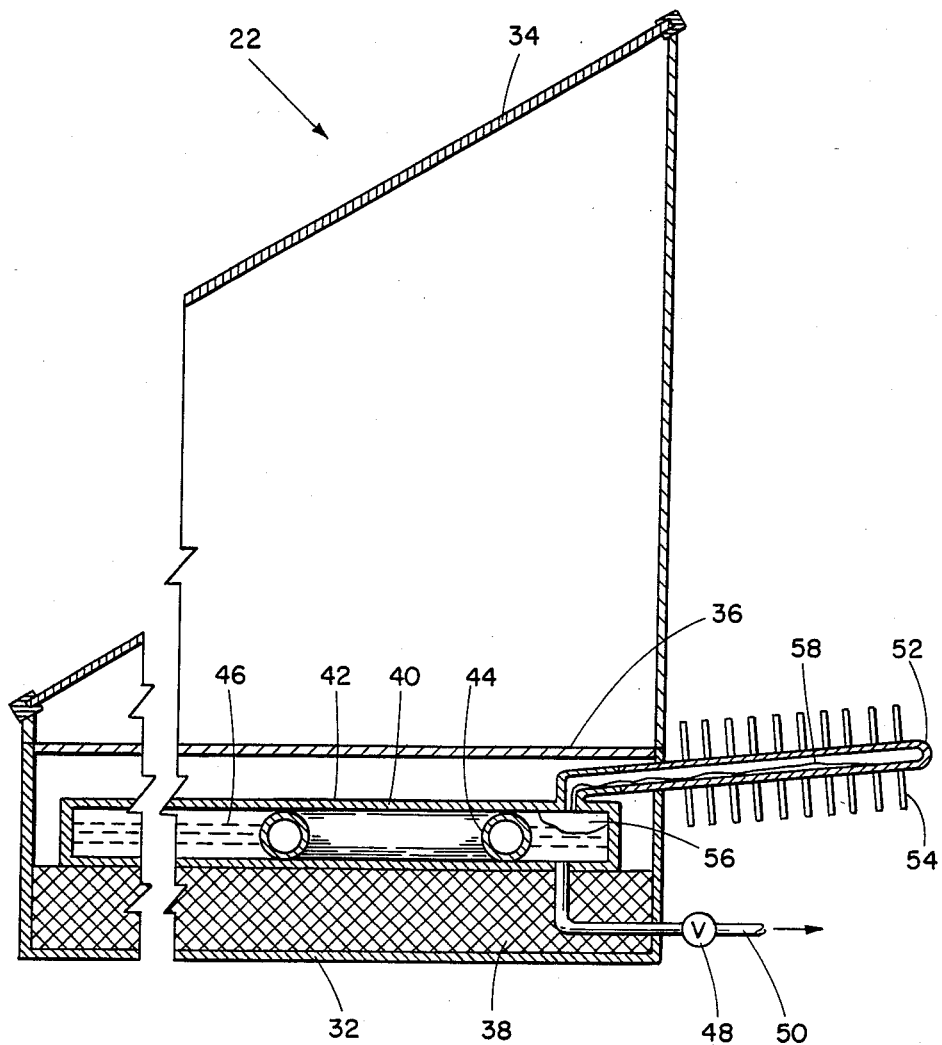
FIG. 4 is a cross-sectional view of a preferred embodiment of the absorber of the integral storage collector.

Tank 40 is filled with a heat storage medium which, typically, is water. A serpentine heat storage medium conduit 44 connects the inlet 26 and outlet 28 and is enclosed within the tank as shown in FIG. 4 or is external to the tank (as shown in FIG. 3) but in heat exchange relationship with it; the conduit 44 carries the water to be heated. While copper is the material of preference for the construction of conduit 44, other metals (e.g. iron or aluminum) or plastics (PVC, ABS, etc.) can also be used.

Heat storage mediums other than water such as heat transfer coils may also be used; however, for several reasons water is the preferred medium. For one, water is very inexpensive and is readily available. Further, where fresh water without antifreeze is used, there is no danger of contamination of the line water. Finally, by use of water as the storage medium, freezing of the line water in the collector is avoided. At night, where the ambient temperature drops below freezing, the temperature of the water in the collector, including the storage medium, can be expected to drop to 32° F., the freezing temperature of water. But the heat of fusion which must be removed from the large mass of water at the freezing temperature before the water will freeze is substantial. Given the high thermal insulating characteristics of the storage collector, there is insufficient heat transfer from the heat storage water to freeze that water. Total freezing would only occur after days of subfreezing weather with no light, an unlikely occurrence in most regions.

Thus, because the substantial heat of fusion required to freeze the tank of water prevents the line water from freezing, the storage medium must have a fusion temperature of 32° or higher in subfreezing climate.

During periods when heat is not extracted from the heat storage medium, that is when water is not being drawn through the system, the daytime temperature of the water could reach 300° to 400° F. The tank construction which would be required to withstand such high temperatures and the resultant high pressure is expensive. Thus pressure relief means are provided.

In regions where such high temperatures are not likely, a simple pressure release valve 48 may be used (FIG. 4). The valve is in fluid communication with the heat storage medium through a port 50. If the pressure in the tank 40 were to build up to some predetermined level, for example in the order of two atmospheres, the valve 48 would open and pressurized fluid would be expelled. Unless an overflow tank were used in conjunction with the valve 48, the tank 40 would then have to be refilled.

Where over-temperature conditions are likely, some other means for controlling the temperature and thus the pressure of the heat storage water is preferred. For that purpose, a heat pipe 52 shown in FIGS. 2, 3 and 4 is provided at the upper end of the heat storage tank. Although shown in FIG. 2 as a U-shaped tube connected at each end to the tank 40, the heat pipe may be a straight or bent tube closed at one end. Heat conducting fins 54 are spaced along the tube 52.

At the usual operating temperatures of the storage collector, that is at about 130° F. to 150° F., there is little vapor in the space 56 over the heat storage water 46. Thus, heat losses through the pipe 52 result only from heat conduction through the dry air and the sides of the tube. Those heat losses are insignificant. However, when the temperature of the water in tank 40 approaches the vaporization temperature, or boiling temperature, of water at 212° F., the tube 52 is converted into a simplified heat pipe. Water vapor fills the pipe 52, is cooled by heat transfer into the environment, and condenses. The cooled condensed liquid 58 then flows back into the tank 40 as return condensate. Thus, as in a conventional heat pipe, there is a natural convection of hot vapor toward the cold end of the pipe with the flow of condensate back to the hot end of the pipe. The substantial heat of vaporization is extracted from the vapor and passed to the cool environment.

In operation, the integral storage collector 22 is placed on a flat surface, such as a flat roof top, or the ground. Contrary to all expectations and as noted earlier, the loss in efficiency from not having the absorber surface 42 substantially perpendicular to the direction of incident solar radiation is not dramatic but amounts to only about 10% in an area having the temperature profile of Boston, Mass. (it is even less significant in the warmer climate). This sacrifice in efficiency is more than made up by the savings in economy. That is, by the use of a reflecting material on the inside of panels 45 and 47, energy from a significantly larger area is directed to the tank 42. However, it should be noted that even without the reflecting means or panels 45 and 47, little losses in energy absorbtion occur. Thus reflecting means are not required. Side panels 57 and 57' (the latter not shown) in FIG. 2 can also optionally have a reflecting surface on the panels interior to enhance efficiency. This has the effect of concentration; i.e., increasing the amount of solar energy incident on the absorber, without a corresponding increase in absorber area. Higher operating temperatures and/or retention of heat for longer time periods are therefore readily obtained. Further, the reflective backing and the angled cover largely mitigate the need for collector tilt. Thus, the collector finds acceptance in areas where buildings are predominantly of the flat roof type. In addition, the lack of tilt greatly simplifies mounting hardware and installation. In most applications, the system would simply be laid on the roof and connected to the plumbing.

Tests indicate that the system can provide 40 to 60% of the heating requirements for a home hot water system at about half of the installation cost of prior comparable systems. Further, reliability is increased and maintenance costs are reduced because of the absence of a pump and control circuitry.

While the invention has been particularly shown and described with reference to a preferred embodiment thereof, it will be understood by those skilled in the art that various changes in form and details may be made therein without departing from the spirit and scope of the invention as described by the appended claims.

We claim:

1. In a solar heating system for heating water comprising
    a. an integral storage collector exposed to solar illumination said collector including absorber means, a heat storage medium of large heat capacity and high thermal conductivity directly heated by said absorber means and a water flow path in heat exchange relationship with said heat storage medium; said water flow path having connected thereto a water inlet and a water outlet; and
    b. a primary pressurized water supply line connected to said water inlet, whereby line pressure from said primary pressurized water supply line into said water inlet forces fresh water through said water flow path of the collector, as heated water is removed through said water outlet; the improvement comprising a collector cover essentially transparent to solar illumination, said collector cover forming an angle of about 5° to about 40° with respect to said integral storage collector; said collector cover and said integral storage collector connected by at least one solar radiation reflecting means, wherein said reflector is positioned at an outer edge and substantially perpendicular to said absorber and said integral storage collector positioned substantially parallel to the horizon.

2. In a solar heating system for heating water comprising
    a. an integral storage collector exposed to solar illumination said collector including absorber means, a heat storage medium of large heat capacity and high thermal conductivity directly heated by said absorber means and a water flow path in heat exchange relationship with said heat storage medium; said water flow path having connected thereto a water inlet and a water outlet; and
    b. a primary pressurized water supply line connected to said water inlet, whereby line pressure from said primary pressurized water supply line into said water inlet forces fresh water through said water flow path of the collector, as heated water is removed through said water outlet; the improvement comprising a collector cover essentially transparent to solar illumination, said collector cover forming an angle of about 5° to about 40° with respect to said integral storage collector; said collector cover and said integral storage collector connected by at least one support means wherein a solar radiator reflecting means is at an outer edge and substantially perpendicular to the absorber and said integral storage collector positioned substantially parallel to the horizon.

3. The solar heating system in accordance with claim 2 wherein at least one solar radiation transparent panel is spaced below said collector cover and above said absorber.

4. The solar energy heating system in accordance with claim 3 wherein said support means is a solar radiation transparent panel said panel parallel to said absorber.

5. The solar heating system in accordance with claim 4 wherein a second solar radiation reflecting means is positioned at the edge opposite the solar radiation reflecting means and substantially perpendicular to said absorber.

6. The solar water heating system in accordance with claim 5 wherein said integral storage collector is an elastomeric material and said water flow path is exterior to said collector.

7. The solar heating system in accordance with claim 6 wherein said collector cover forms an angle from about 15° to about 40° with said absorber.

8. In a solar collector for heating water comprising absorber means for absorbing solar energy; heat storage medium directly heated by said absorber means and having a fusion temperature which is about the same as but not less than the fusion temperature of water; water flow path in heat exchange relationship with the heat storage medium; and thermal insulation insulating the side of the heat storage medium opposite the absorber means; the improvement comprising covering said solar collector with a collector cover essentially transparent to solar illumination, said collector cover forming an angle of between about 5° to about 40° with said absorber means, and a support means positioned between said collector cover and said absorber surface wherein a solar radiator reflecting means is at an outer edge and substantially perpendicular to said absorber and said absorber is positioned substantially parallel to the horizon.

9. The solar collector in accordance with claim 8 wherein at least one solar radiation transparent panel is spaced below said collector cover and above said absorber.

10. The solar collector in accordance with claim 9 wherein said support means is a solar radiation transparent panel said panel parallel to said absorber.

11. The solar collector in accordance with claim 10 wherein a second solar radiation reflecting means is positioned at the edge opposite the solar radiation reflecting means and substantially perpendicular to said absorber.

12. The solar collector in accordance with claim 11 wherein said integral storage collector is an elastomeric material and said water flow path is exterior to said collector.

13. The solar collector in accordance with claim 12 wherein said collector cover forms an angle from about 15° to about 40° with said absorber.

14. An improved method of heating water comprising providing a solar collector having a heat storage medium therein and a water flow path in heat exchange relationship with said heat storage medium; exposing the solar collector to solar illumination; and directing line water at line pressure through the water flow path of the solar collector; the improvement comprising covering said solar collector with a collector cover essentially transparent to solar illumination said collector cover at an angle of between about 5° and about 40° to the solar collector; at least one support means connecting said solar collector and said collector cover and positioning a solar radiator reflecting means at an outer edge and substantially perpendicular to said collector; and positioning said solar collector substantially parallel to the horizon.

15. The method in accordance with claim 14 wherein at least one solar radiation transparent panel is spaced below said collector cover and above said absorber.

16. The method in accordance with claim 15 wherein said support means is a solar radiation transparent panel said panel parallel to said absorber.

17. The method in accordance with claim 16 wherein a second solar radiation reflecting means is positioned at the edge opposite the solar radiation reflecting means and substantially perpendicular to said absorber.

18. The method in accordance with claim 17 wherein said integral storage collector is an elastomeric material and said water flow path is exterior to said collector.

19. The method in accordance with claim 18 wherein said collector cover forms an angle from about 15° to about 40° with said absorber.

* * * * *